United States Patent [19]

Stanek

[11] 3,994,211
[45] Nov. 30, 1976

[54] GRIDDLE FOR MAKING CREPES
[75] Inventor: Richard F. Stanek, Forest Park, Ill.
[73] Assignee: J. R. Clark Company, Terre Haute, Ind.
[22] Filed: Apr. 3, 1975
[21] Appl. No.: 564,828

Related U.S. Application Data
[63] Continuation-in-part of Ser. No. 401,896, Sept. 28, 1973, abandoned.

[52] U.S. Cl. .................................... 99/425; 99/375
[51] Int. Cl.² .......................................... A47J 37/10
[58] Field of Search ...................... 99/422, 423–424, 99/425, 325, 331–332, 339, 340, 372, 375–376, 400, 403, 426–427, 431, 443–444, 445–446

[56] References Cited
UNITED STATES PATENTS

| | | | |
|---|---|---|---|
| 1,732,910 | 10/1929 | Possons................................ | 99/425 |
| 1,809,580 | 6/1931 | Carter.................................. | 99/375 X |
| 2,085,220 | 6/1937 | Howlett............................... | 99/425 UX |
| 2,413,204 | 12/1946 | Wolff.................................... | 99/425 X |
| 3,344,735 | 10/1967 | Kochman............................. | 99/340 |
| 3,747,506 | 7/1973 | Belgard................................ | 99/425 X |
| 3,850,087 | 11/1974 | Landblom et al..................... | 99/422 |

FOREIGN PATENTS OR APPLICATIONS
923,503  2/1955  Germany ............................... 99/425

Primary Examiner—Edward L. Roberts
Assistant Examiner—Arthur O. Henderson
Attorney, Agent, or Firm—Carl C. Batz

[57] ABSTRACT

A griddle for making crepes having a base portion which includes a circular outer rim and a circular inner rim with a circular channel therebetween. The inner rim forms a wall which rises to join with the outer edge portion of the central circular cooking plate, and the outer surface of the wall joins with the outer edge of the top of the cooking plate at about a 90° angle to form a sharp edge. The plane of the top of the cooking plate is above the plane of the top edge of the outer rim so as to permit a spatula to be inserted under the crepe with its blade parallel with the top of the plate, and to permit trimming of the edges of the crepe with the end of the spatula. A downwardly extending rim is provided on which the griddle may rest, and an opening is provided in the outer rim through which crumbs may be passed from the channel out of the griddle.

2 Claims, 4 Drawing Figures

GRIDDLE FOR MAKING CREPES

This application is a continuation-in-part of my application Ser. No. 401,896, filed Sept. 28, 1973, now abandoned.

This invention relates to a griddle for making crepes. Crepes are of the nature of thinly-formed pancakes. More particularly the invention deals with a griddle which can be accommodated over the burner of a domestic range, which will have improved heat transfer qualities and which will facilitate the special manipulation which is needed to make crepes of high quality.

BACKGROUND

Crepes have become quite popular and it is not unusual that a commercial food shop specialize in making crepes of various kinds. Such shop may be equipped with special equipment which is much too elaborate and expensive to be considered for home use. The very nature of the cooking operation in making crepes means that there will be waste, including crumbs and bits of burned material, and it is very difficult either in the commercial shops or in the home to keep the equipment clean and free from such waste.

It is necessary to form the crepes in a circular shape. This means that in spreading the batter on a hot plate it is unavoidable that some batter will be extended beyond the circular boundary and this further adds to the problem of how to handle the batter which extends over the edge.

When it comes to the griddle which can be used in the home, it is still more important that the untidiness which usually attends such cooking be avoided.

Further, it would be desirable to have a griddle on which crepes could be made and which would be neat and compact and which could be utilized on the burner of a range ordinarily used for household use, but yet be removable and easily stored when not in use.

It is also to be understood that the griddle needed is one which will perform efficiently to make crepes of professional quality. The situation is one where very small structural differences make very important differences in the results obtained.

Accordingly, I have set myself to the provision of a griddle to satisfy the requirements as above outlined. Further, I want to provide a griddle which can be easily used by persons of minimum experience to produce crepes of high quality. I would like also to provide a griddle structure which is simple of construction and can be supplied at a cost the housewife can afford to pay. Other objects and advantages of the invention will appear as the following detailed description proceeds.

DETAILED DESCRIPTION

One embodiment of my invention is illustrated in the accompanying drawing in which FIG. 1 is a plan view of the improved griddle and showing the position of a spatula as the operator uses it to trim a crepe;

Figure 1:
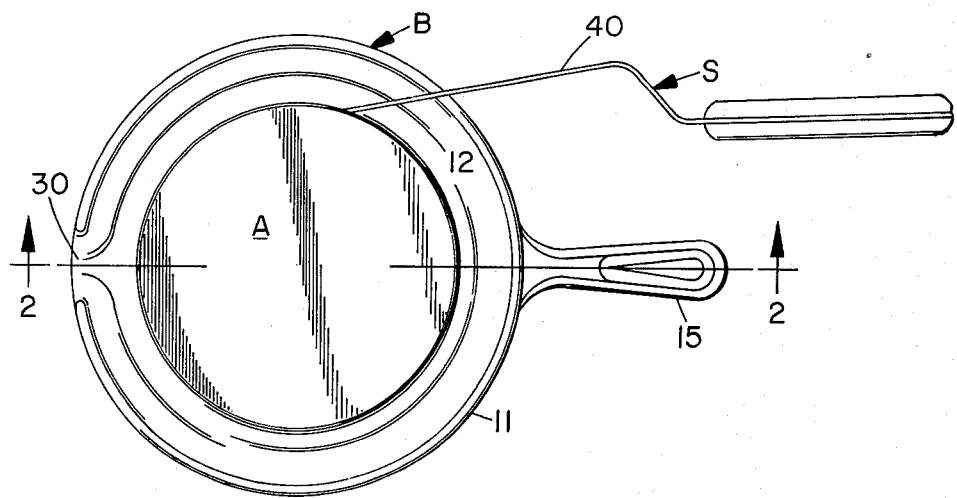
Figure 2:
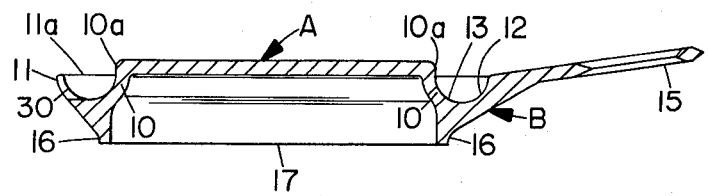
FIG. 2 is a sectional view, the section being taken as seen from line 2—2 of FIG. 1.

As illustrated, the griddle is a single casting made of cast iron. It has two general parts—the general cooking plate A, and the base portion B.

The cooking plate A is centrally located at the top of the griddle and has uniform thickness which is sufficient to hold the heat supplied by the burner of the stove. This plate has a top surface which is flat and in a horizontal plane and has a circular edge at its perimeter.

The base portion B has an inner upwardly extending circular rim 10 which merges at its top with the edge portion of plate A. Since the top plate A and the base portion B are formed in a single casting, there is no line of division between these parts. The inner rim 10 forms a wall having its outer surface 10a merging smoothly with the circular edge of the plate making a 90° angle with the top surface of the plate, thus providing a sharp edge about the top surface of the plate.

Portion B has an outer upwardly extending rim 11 which has its top edge in a horizontal plane which is below the plane of the top surface of plate A. The reason for this will appear more clearly as this specification proceeds.

The rims 10 and 11 provide between them a circular channel 12 which has a rounded bottom 13, thus eliminating corners in the channel. There is provided a smooth surface without corners therein leading upwardly from the bottom of the channel on one side to the plate A and on the other side to edge 11a of the outer rim 11.

The base portion B has a downwardly extending circular rim 16, the bottom edge of which is in horizontal plane to provide a surface on which the griddle may rest.

Figure 3:
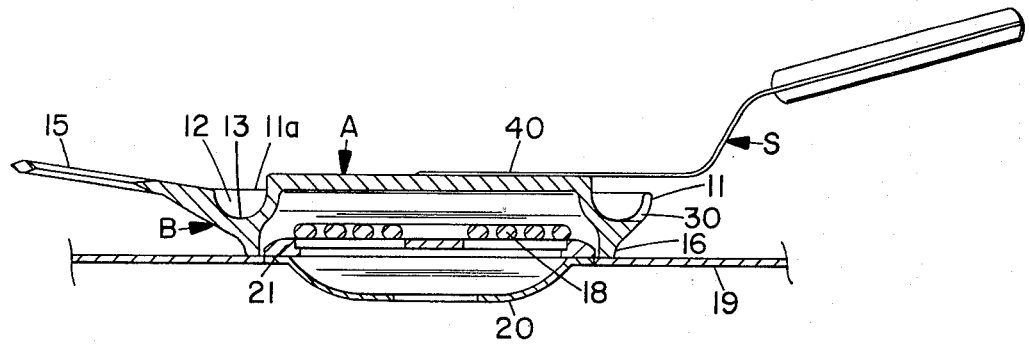
FIG. 3 is a schematic view in cross section showing the griddle in place on an electric range and the position of the spatula when the operator separates the crepe from the griddle.

FIG. 3 illustrates the improved griddle in place over an electric heating element 18. As illustrated, the top of an electric range 19 has an opening therein into which the pan 20 is fitted, and a ring 21 fits over the edges of the pan. Contained within the ring 21 is the electric element 18. The ring and the electric element are contained within the inner rim 10 and the element gives off heat principally to the top plate A and to the inner surfaces of the portion B. Since the downwardly extending rim 17 of the griddle extends about the ring and heating element, it is held properly in place and prevented from sliding across the top of the stove.

Figure 4:
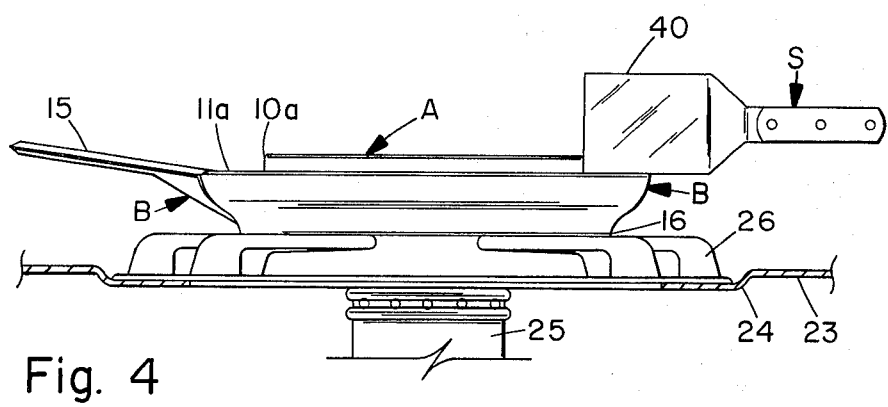
FIG. 4 is a schematic view taken from the side showing the griddle in place on a gas range and the position of the spatula when the operator trims the crepe.

FIG. 4 illustrates the improved griddle in place on a gas stove. The top 23 of the gas range has a depression 24 which contains a central opening within which is the gas burner 25. A spider 26 sets within the depression 24 and the griddle has its lower rim 16 resting on this spider 26.

The improved griddle as illustrated includes a side channel 30 which serves as a clean-out trough through which crumbs and burned matter in channel 12 may be easily removed from the griddle. The side channel 30 has a rounded bottom surface and extends radially of the griddle through the outer rim 11. The bottom of channel 30 may be on an even level or somewhat lower than the level of channel 12. Thus the channel provides smooth easy passage brushing brusing crumbs around channel 12 and out through channel 30 to a side of the griddle.

In the use of the improved griddle, for example, in connection with an electric range, the griddle is placed as illustrated in FIG. 3 over an electric burner with the surface 17 resting on top of the range, and the burner ignited.

When the griddle has reached the desired temperature for cooking crepes, the operator takes a ladle of batter and places the batter on top of plate A beginning at the center and working the batter out to the edge of plate A. A small amount of batter may pass over the edge of plate A and be converted to a crisp or crumbs which may fall into the channel 12.

When the main body of the crepe has been cooked to the desired degree which can be told by the appearance of the crepe, the operator may take the spatula S and, as illustrated in FIG. 3, insert the spatula under the edge of the crepe with the spatula blade flat and parallel with the top plate surface. When the crepe has been loosened from the top plate, the operator may turn the crepe to place it on its other side on the top plate surface, and when the crepe has been desirably cooked on its other side the spatula blade may be inserted as before to remove the crepe from the griddle.

It is an important feature of the improved griddle that the operator may while the crepe is cooking on one or another side pass his spatula about the griddle to cut off any overhanging portion of the crepe and make the crepe exactly circular. This may be done by placing the spatula in the position shown in FIGS. 1 and 4 with the blade 40 of the spatula vertical with its one edge resting on the edge 11a of the outer rim 11 and with the end of the spatula blade against the cylindrical surface 10a of the outer edge of plate A, with the blade making an acute angle with surface 10 at the point of contact. With the spatula in this position the operator may push the spatula about the edge of plate A with its lower edge sliding on edge 11a of the rim 11, and trim the edges of the crepe. Having the plane of the top of plate A above the plane of the top edge 11a not only allows the operator to insert the spatula blade horizontally under the crepe as shown in FIG. 3 but permits the trimming of the edges of the crepe as illustrated in FIGS. 1 and 4. The plane of the top of the plate should be appreciably above the plane of the top of the outside rim 11 so that the spatula blade will catch the edge of the top of the plate when the blade is vertical with its bottom edge approximately horizontal, suitably from ¼ inch to 1 inch, but preferably not by a distance greater than the width of the spatula blade. The trimmings which are usually in the form of crisp or burned crumbs, fall down into channel 12, and occasionally may be removed easily from the griddle.

At the end of the cooking operation, desirably after the griddle has cooled, the operator may easily clean the griddle by wiping with a towel and may store it in a small space until it may again be required.

An important feature of the invention is that it may be formed in one piece of cast iron. The cast iron has minute pores at its surface and may be seasoned with oil to form the most desirable cooking surface while another metal such as aluminum is not capable of this function. Although aluminum, for example, has good heat conducting properties it will not hold heat necessary for making crepes and will not brown but will cook the crepes to a yellow color. Further, only by one-piece construction can the superior heat distribution of my improved griddle take place. Any line of separation within the metal interrupts the desired distribution and affects the quality of the crepe products made on the griddle.

While I have illustrated and described in detail only one embodiment of the improved griddle, it is understood that variations and changes may be made all within the spirit of the invention and the scope of the appended claims.

What is claimed is:

1. A griddle for making crepes, said griddle being of one piece cast iron, said griddle further comprising a central top plate cooking surface having a circular edge, a horizontal flat top surface, and a base portion having a circular upwardly extending inner rim which merges with the circular edge portion of said plate and forms a cylindrical wall which extends upwardly to said circular edge, and an outer circular upwardly extending rim the top edge of which is in a horizontal plane, a circular channel between said rims having a rounded bottom, the top surface of said plate being in a horizontal plane above the plane of the top edge of said outer rim.

2. A griddle as set forth in claim 1 in which said base portion has a single circular downwardly extending rim to provide on its bottom a surface on which the griddle may rest.

* * * * *